United States Patent
Louch et al.

(10) Patent No.: US 7,869,906 B2
(45) Date of Patent: Jan. 11, 2011

(54) WIRELESS GATEWAY APPARATUS AND METHOD OF BRIDGING DATA BETWEEN VEHICLE BASED AND EXTERNAL DATA NETWORKS

(75) Inventors: Robert Louch, Highland, MI (US); Donald Franks, Linden, MI (US); Brian C. Moorhead, Willis, MI (US); Hasdi R. Hashim, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 991 days.

(21) Appl. No.: 11/620,760

(22) Filed: Jan. 8, 2007

(65) Prior Publication Data

US 2008/0167758 A1 Jul. 10, 2008

(51) Int. Cl.
G05D 1/00 (2006.01)
G06F 7/00 (2006.01)

(52) U.S. Cl. ......................................................... 701/1
(58) Field of Classification Search ........................ None
See application file for complete search history.

(56) References Cited

U.S. PATENT DOCUMENTS

| 5,157,610 | A | | 10/1992 | Asano et al. |
| 5,305,331 | A | * | 4/1994 | Sato et al. .................... 714/715 |
| 5,415,001 | A | * | 5/1995 | Powars ........................ 62/50.2 |
| 5,473,540 | A | | 12/1995 | Schmitz |
| 5,850,445 | A | * | 12/1998 | Chan et al. .................. 380/247 |
| 5,884,202 | A | | 3/1999 | Arjomand |
| 5,922,037 | A | | 7/1999 | Potts |
| 5,970,144 | A | * | 10/1999 | Chan et al. .................. 380/247 |
| 6,025,776 | A | | 2/2000 | Matsuura |
| 6,104,988 | A | | 8/2000 | Klarer |
| 6,112,152 | A | | 8/2000 | Tuttle |
| 6,181,994 | B1 | | 1/2001 | Colson et al. |
| 6,246,688 | B1 | | 6/2001 | Angwin et al. |
| 6,263,268 | B1 | | 7/2001 | Nathanson |
| 6,295,492 | B1 | | 9/2001 | Lang et al. |
| 6,408,232 | B1 | | 6/2002 | Cannon et al. |
| 6,487,717 | B1 | | 11/2002 | Brunemann et al. |
| 6,502,020 | B2 | | 12/2002 | Lang |
| 6,505,100 | B1 | | 1/2003 | Stuempfle et al. |
| 6,662,198 | B2 | * | 12/2003 | Satyanarayanan et al. ... 707/204 |
| 6,772,248 | B1 | | 8/2004 | McClure et al. |
| 7,171,426 | B2 | * | 1/2007 | Farmer et al. ............. 707/104.1 |
| 2004/0023645 | A1 | * | 2/2004 | Olsen et al. .................. 455/418 |
| 2006/0161344 | A1 | * | 7/2006 | Iwahori et al. .............. 701/211 |

FOREIGN PATENT DOCUMENTS

WO WO 2007/117285 10/2007

* cited by examiner

*Primary Examiner*—Khoi Tran
*Assistant Examiner*—Bhavesh V Amin
(74) *Attorney, Agent, or Firm*—Angela M. Brunetti; David B. Kelley

(57) ABSTRACT

A vehicle network gateway providing off board diagnostic and computer based devices with access to vehicle network data such as signal values and diagnostic error information. The gateway eliminating the deleterious effects of electrical loading on the vehicle network and the introduction of noise onto the vehicle network by off board devices. The gateway adapted to bridge data between the vehicle networks and a variety of external networks including conventional wireless and hardwired networks providing wireless access of vehicle diagnostic data over external networks at vehicle repair and service centers.

10 Claims, 8 Drawing Sheets

WIRELESS GATEWAY APPARATUS AND METHOD OF BRIDGING DATA BETWEEN VEHICLE BASED AND EXTERNAL DATA NETWORKS

BACKGROUND OF THE INVENTION

1. Field of the Invention

The disclosures made herein relate generally to motor vehicle based controller and sensor networks and, more particularly, to wireless gateway apparatus for interconnecting and bridging data between at least one vehicle based network and at least one external network.

2. Disclosure Information

Motor vehicles are commonly equipped with vehicle based data networks for connection and cooperative data exchange between vehicle electronic sensors and vehicle control modules. Such modules are networked to vehicle based engine management systems and other such vehicle operation systems. Several types of vehicle networks are in common use; one non-limiting example is the controller area network (CAN). The controller area network (CAN) is a multicast shared serial bus standard, originally developed in the 1980s by Robert Bosch GmbH. CAN was specifically designed to be robust in electromagnetically noisy environments and can utilize a differential balanced wired network serial line like RS-485. Another non-limiting example of a vehicle based network is a network based on the FlexRay™ protocol. FlexRay™ is a communications protocol driven by the FlexRay Consortium and developed to provide high data throughput for more recent motor vehicle developments in steer by wire, brake by wire and stability control systems, for example. Other vehicle network physical layers and protocols are known to those skilled in the art and are applicable to the vehicle network gateway apparatus as disclosed herein. The disclosures herein are not limited to the vehicle network hardware and protocols utilized, but are instead targeted to work with any vehicle based network.

It is known to provide off board vehicle diagnostic equipment which access vehicle based networks through hardwired vehicle network interconnect jacks located on the vehicle frame or cabin structures. Off board diagnostic equipment, say at a service or repair shop, can then conduct vehicle diagnostic analysis of sensor and command signals, vehicle management computer recorded error codes, as well as manipulate various control modules for diagnostic purposes. Since the information necessary to conduct vehicle problem diagnosis is readily available over the vehicle network, diagnosis of possible vehicle faults is made easier.

A limitation of conventional approaches to the accessing of vehicle networks from off board devices is that the devices typically share one common hardwired access point into the vehicle network. Each off board device connected to the vehicle network induces additional electrical loads and potential external noise into the vehicle network. The cumulative effect of the loading of the vehicle network from external off board devices may eventually cause the vehicle network to fault or crash, causing the vehicle sensor and controller modules to lose cooperative communication with engine and vehicle management systems with unintended and potentially serious consequences.

Another limitation of conventional approaches to accessing of vehicle networks from off board devices is the requirement that the off board devices need to be physically connected in a physical hardwired fashion to the vehicle network.

Another limitation of conventional approaches of diagnosing vehicle faults through the vehicle common hardwired access point is that the vehicle sensor and message data summary, statistical and logging functions that may be provided on the off board diagnostic devices are only available when the vehicle is connected to the off board diagnostic device, say in a repair or service facility, and are not available while the vehicle is on the road away from the shop and experiencing a fault. As can be understood, it is advantageous to the diagnosis and remediation of a vehicle problem to gather and record data before, at the occurrence of and for some time after the occurrence of a fault. Conventional approaches to interfacing vehicle off board diagnostic equipment to the vehicle network do not readily facilitate this.

Therefore, a vehicle network gateway that provides vehicle network data access to multiple off board diagnostic and computer based devices, electrically isolates off vehicle diagnostic and computer based devices from the vehicle networks, and which eliminates the deleterious effects of unwanted electrical loading and noise while providing security to the vehicle network would be advantageous. A vehicle network gateway apparatus, system and method which also gathers signal summary and statistics data on network message signals, provides data logging capabilities, and which bridges data between the vehicle networks and external networks, and provides wireless access of vehicle diagnostic data to diagnostic equipment in vehicle repair and service centers would be useful, advantageous and novel.

SUMMARY OF THE INVENTION

Embodiments of the inventive disclosures made herein comprise various embodiments of a wireless gateway apparatus, system and method of bridging data between vehicle based networks and external local and wide area networks where the external networks can be any combination of wired and wireless.

In a first embodiment of the inventive disclosures made herein the vehicle network gateway comprises a computer processor based programmable logic system, together with memory for storing data and computer executable code enabling the functions of the gateway. The memory may comprise a non-volatile memory such as flash memory, or may comprise, for example, a combination of memory types including, for example, static memory, dynamic memory, various forms of read-only memory, magnetic medium memory such as disc drives. The gateway device includes computer executable code to enable functions including the bi-directional bridging of vehicle message data between one or more vehicle networks and one or more external networks, monitoring vehicle network message traffic, wherein the bridging comprises converting messages between a vehicle network protocol and at least one external network protocol. On the vehicle data networks some portion of the messages contain sensor signal data and control data exchanged between electronic information containing modules in at least one vehicle management computer. It is typical for the vehicle control computer to include diagnostic methods or the detection of certain error conditions in the vehicle such as engine sensors and control modules. The vehicle network gateway provides devices on external networks with access to signal and control data available on the vehicle network while isolating and protecting the vehicle network by permitting external networked devices to access this data through the gateway, eliminating the need for a direct hardwired connection into the vehicle networks.

In one or more embodiments the vehicle network gateway includes at least one radio frequency wireless network interface supporting network connections between the gateway and one or more wireless network enabled devices. Wireless network enabled devices may include but are not limited to wireless network routers, wireless network hubs, wireless network equipped client devices such as personal digital assistants (PDAs), personal computers, service and diagnostic equipment, automotive original equipment manufacturer (OEM) vehicle development systems (used during new vehicle development), and other types of wireless network equipped devices.

In one or more embodiments, the vehicle network gateway wireless network interface may be implemented to provide support for various known network, transport and protocol standards. One wireless network example is the IEEE 802.11, also called the Wi-Fi standard. 802.11 denotes a set of Wireless LAN/WLAN standards developed by working group 11 of the IEEE LAN/MAN Standards Committee (IEEE 802). 802.11b and 802.11g standards use the 2.4 gigahertz (GHz) band, operating (in the USA) under Part 15 of the FCC Rules and Regulations. Because of this choice of frequency band, 802.11b and 802.11g equipment can incur interference from microwave ovens, cordless telephones, BlueTooth devices, and other appliances using this same band. Another standard, the 802.11a standard uses the 5 GHz band, and is therefore not affected by products operating on the 2.4 GHz band. The vehicle network gateway wireless network interface is not limited to the use of the 802.11x wireless network standards. 802.11 Wi-Fi is discussed herein as it is a very widely deployed and commonly used type of wireless computer networking in offices and homes, and is therefore seen as an advantageous type of external network for the vehicle network gateway to provide an external network interface to. Wireless networks typically utilize radio frequency carriers having network protocols modulated upon the carrier.

In various disclosed embodiments the vehicle network gateway, external wireless networks to which the vehicle network gateway may provide data interfaces to are not limited to the use of radio frequency based Wi-Fi networks, but also include short range networks such as BlueTooth, and may instead include or in addition include line of sight optically coupled data network communication using visible or invisible light portions of the electromagnetic spectrum as a carrier, using spectrum portions such as infrared, visible or ultraviolet light as the data carrier between a data transmit/receiver module on the vehicle and a line of sight coupled external transmit/receiver module. In some instances this line of sight coupling can be used for vehicle fueling support, for example hydrogen fueling to hydrogen powered vehicles where measured values such as vehicle hydrogen tank charge and tank pressure need to be communicated between the refueling station equipment and the hydrogen vehicle.

In one or more embodiments the vehicle network gateway enforces a read only limited access mode to vehicle network data accessed through the gateway by a non authorized external network client. Clients which are authenticated and authorized by the gateway can be provided with broader vehicle network access rights, for example the ability to write data to nodes on the vehicle network and the ability to send control messages.

In one or more embodiments the vehicle network gateway includes a vehicle network message database defining vehicle network messages, nodes, signal and signal range parameters. The message database permits the vehicle network gateway to interpret vehicle network messages for data such as signal values. Additionally, in certain embodiments this message database is available for download to clients on external networks for the client's use in interpreting vehicle network messages.

In one or more embodiments the vehicle network gateway apparatus has computer executable code resident in the vehicle network gateway for accumulating real-time statistics of at least a portion of networked vehicle signals. In some of these embodiments the real-time statistics include some portion of the following for each monitored network signal: signal minimum value, maximum value, average value, last value, standard deviation, signal in-range count, signal out-of-range count, signal error value count, and signal no value count.

In one or more embodiments at least one vehicle data network is a multicast shared serial bus network. One common example of this type of vehicle network is the Controller Area Network (CAN) as discussed earlier in the background section, and the vehicle network gateway is adapted to communicate with the vehicle network using CAN protocol.

In one or more embodiments at least one vehicle data network for communicating with vehicle sensor and control modules utilizes the FlexRay™ protocol as defined by the FlexRay consortium. FleyRay™ is an in-vehicle network standard championed by Freescale Semiconductor and Royal Philips Electronics, variants of which are also in use in aviation applications such as fighter jets.

In one or more embodiments the vehicle network gateway apparatus includes computer executable code resident in the vehicle network gateway for accumulating real-time statistics of at least a portion of vehicle signal values transmitted over the vehicle data network or networks. In these embodiments the real-time statistics may include some or all of the following: signal minimum value, maximum value, average value, last value, standard deviation, signal in-range count, signal out-of-range count, signal error value count, and signal no value count.

In one or more embodiments the vehicle network gateway apparatus includes computer executable code resident in the vehicle network gateway for signal strobe logging of a configurable strobe logging set (none, one, a subset or the full set) of the vehicle network signals defined in the vehicle network message database. Strobe logging comprises monitoring the vehicle networks for messages having signals configured for strobe logging, extracting the signal from the messages and storing strobed signal values to a signal strobe log in the memory means of the vehicle network gateway. The strobed signals may include a time stamp.

In one or more embodiments the vehicle network gateway apparatus includes computer executable code resident in the vehicle network gateway for logging of a configurable data logging set (none, one, a subset or the full set) of the vehicle network messages defined in the vehicle network message database. Data logging comprises listening for, receiving and interpreting vehicle network messages that are members of the configured data logging set and storing the entire message value to a data log in the memory means. The individual data logged messages may include a time stamp.

In one or more embodiments the vehicle network gateway apparatus includes computer executable trigger logging code resident in the vehicle network gateway for configuring and detecting a set of vehicle network signal trigger conditions, where the trigger conditions are used to automatically trigger the periodic logging of a set of configured trigger log signals read from the modules in communication with the vehicle data network.

It is an advantage of the inventive disclosures made herein to provide a vehicle network gateway apparatus that enables access to data resident on an in-vehicle data network to multiple off board diagnostic and computer based devices.

It is another advantage of the inventive disclosures made herein to provide a vehicle network gateway that electrically isolates off board diagnostic and computer based devices from the in-vehicle data network.

It is another advantage of the inventive disclosures made herein to provide a vehicle network gateway that eliminates the deleterious effects of unwanted electrical loading and introduction of noise onto the vehicle network from off vehicle devices tapped into the vehicle data network.

It is another advantage of the inventive disclosures made herein to provide a vehicle network gateway that provides security to the vehicle network and vehicle network connected devices by limiting unauthorized off board devices to a vehicle network data read only mode.

It is another advantage of the inventive disclosures made herein to provide a vehicle network gateway that is configured to gather signal summary and statistics data on network message signals.

It is another advantage of the inventive disclosures made herein to provide a vehicle network gateway that provides configurable data logging capabilities wherein the logged, summary and statistical data can be read later by one or more off board devices through the vehicle gateway over an external network.

It is another advantage of the inventive disclosures made herein to provide a vehicle network gateway that bridges data between the vehicle networks and external networks including wireless and hardwired data networks.

It is another advantage of the inventive disclosures made herein to provide a vehicle network gateway system that provides wireless access of vehicle diagnostic data available in the vehicle network gateway as well as from vehicle network connected devices such as sensors and control modules including vehicle engine management, drive train, stability control systems and other vehicle network connected devices to diagnostic equipment in vehicle repair and service centers.

Other advantages, as well as features and objects of the present invention will become apparent to the reader of this specification.

BRIEF DESCRIPTION OF THE DRAWINGS

The drawings show a form of the invention that is presently preferred; however, the invention is not limited to the precise arrangement shown in the drawings.

DETAILED DESCRIPTION OF THE PREFERRED EMBODIMENT

In preparation for explaining the details of the present inventive disclosure, it is to be understood by the reader that the invention is not limited to the presented details of the device arrangement, interfaces, network protocols, vehicle network configurations and other embodiment specific features as illustrated in the accompanying drawings, as the invention concepts are clearly capable of other embodiments and of being practiced and realized in various ways by applying the disclosure presented herein.

Figure 1:
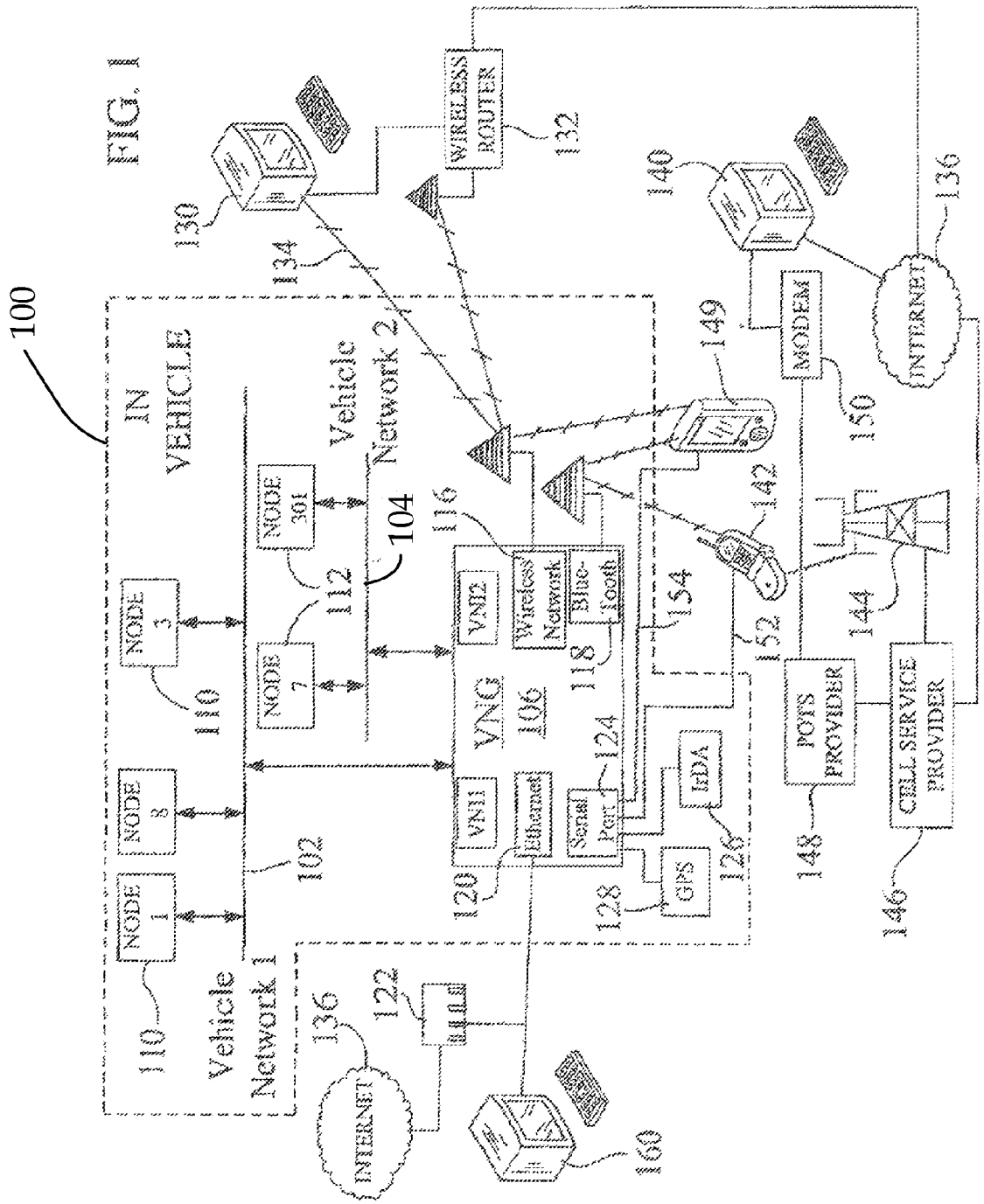
FIG. 1 depicts a block diagram of a vehicle network gateway apparatus in communication with vehicle data networks in accordance with the inventive disclosures herein.

FIG. 1 depicts a block diagram of a vehicle network gateway apparatus in communication with vehicle data networks in accordance with the inventive disclosures herein. The dashed line boundary separates devices that are integrated with the vehicle from devices that are separate or external to the vehicle. A motor vehicle 100 comprises first vehicle network 102 and a second vehicle network 104, both in cooperative communication with a vehicle network gateway 106 in accordance with the inventive disclosures presented herein. FIG. 1 depicts two vehicle data networks 102 and 104, although it is to be understood that the vehicle network gateway is not limited to vehicles having two vehicle networks but is instead applicable to vehicles having one or more vehicle networks. Vehicle networks may be any variety of vehicle data networks as applied to integrate and data interconnect any number of electronic modules/controller devices capable of providing and/or receiving electronic data and/or control signals including digital control signals. A number of electronic modules/controller devices 110 are interfaced with and in addressable communication with the first vehicle network 102, and similarly a number of electronic modules/controller devices 112 are interfaced with and in addressable communication with the second vehicle network 104. The vehicle data networks 102, 104 may comprise a multicast shared serial bus network such as a Controller Area Network (CAN), or vehicle network using the FlexRay™ protocols described earlier, or any other suitable vehicle network physical and protocol networking technologies as would be known to those skilled in the art.

The vehicle network gateway 106 is mounted within the vehicle and in continuous communication with devices 110, 112 on the vehicle networks. The vehicle network gateway 106 includes a network data interfaced to one or more external data networks. External data network interfaces include medium range high speed wireless peer to peer and local area (LAN) networks 116 such as, but not limited to, IEEE 802.11 WiFi wireless LAN, short range peer to peer networks such as BlueTooth 118. The depicted vehicle network gateway 106 also includes facilities for hardwired network 102 connections such as but not limited to 10/100 BaseT connections using CAT 5 cabling to hub or router 122. The hub or router 122 may in certain cases be in communication with the Internet 136 and/or local area network connected devices such as computers 160. The vehicle network gateway also includes at least one serial port 124 to provide hard wired communication with external devices such as a satellite navigation system receiver, for example a Global Positioning System (GPS) receiver 128, as well as communication with a line of sight visible/invisible light data carrier device such as an IrDA device 126 which is adapted to transfer data to another IrDA device over a line of site visible/invisible light data carrier link. The vehicle network gateway wireless LAN interface 116 enables one or more off vehicle computers 130 to access data available on vehicle networks 102, 104 through the vehicle network gateway 106. Off vehicle wireless network devices may wireless connect to the vehicle network gateway on a peer to peer wireless link basis 134 or through a wireless router or hub 132 which forms a node on an off vehicle local area network (LAN). The wireless router or hub 132 LAN may itself be connected to the Internet 136, by which other off vehicle computers such as service bay and diagnostic computers 140 may access data in the vehicle's vehicle data networks 102, 104 as well as data acquired and stored on the vehicle network gateway 106 for a remote location over the Internet 136.

The vehicle network gateway 106 may include a short range wireless data network interface 118 such as but not limited to a BlueTooth wireless data network interface. Using the short range wireless network interface, devices such as a mobile phone or smart phone 142, or a personal digital assistant 149 can wirelessly connect to the vehicle network gateway and be provided with wireless access to data in the vehicle networks 102, 104 as well as data acquired and available through the vehicle network gateway 106. Another way the remote Internet connected computer 140 may accesses vehicle data through the vehicle network gateway 106 is by way of the cellular phone 142. A cellular phone 142 is equipped with a cellular modem which has a data session open to a base station 144 of a cellular or mobile phone service provider 146 through which the cellular phone 142 is connected to the Internet 136. The cellular phone may be used to initiate a data call to the Internet and connect to a diagnostic computer 140 through the Internet 136, wherein the diagnostic computer 140 queries the vehicle network gateway 106 and vehicle network attached devices 102, 104 for signal values and error codes to assist in the diagnosis of a vehicle problem. The cellular phone 142 may alternately establish a data call to a remote diagnostic or other computer system 140 through the cell service provider 146 by way of a data call or plain old telephone service (POTS) provider 148, which is a traditional copper line phone service provider. The POTS service completes the cellular call to the data modem 150 of the diagnostic or other remote computer 140 through which the diagnostic computer 140 queries the vehicle network gateway 106 and vehicle network attached devices 102, 104 for signal values and error codes to assist in the diagnosis of a vehicle problem.

Off vehicle computer based devices such as the cellular phone 142 and PDA 149 may utilize a serial data link connection to the vehicle network gateway 106 by connecting a serial line 152, 154 between the device and a serial port 124 on the vehicle network gateway 106.

Figure 2:
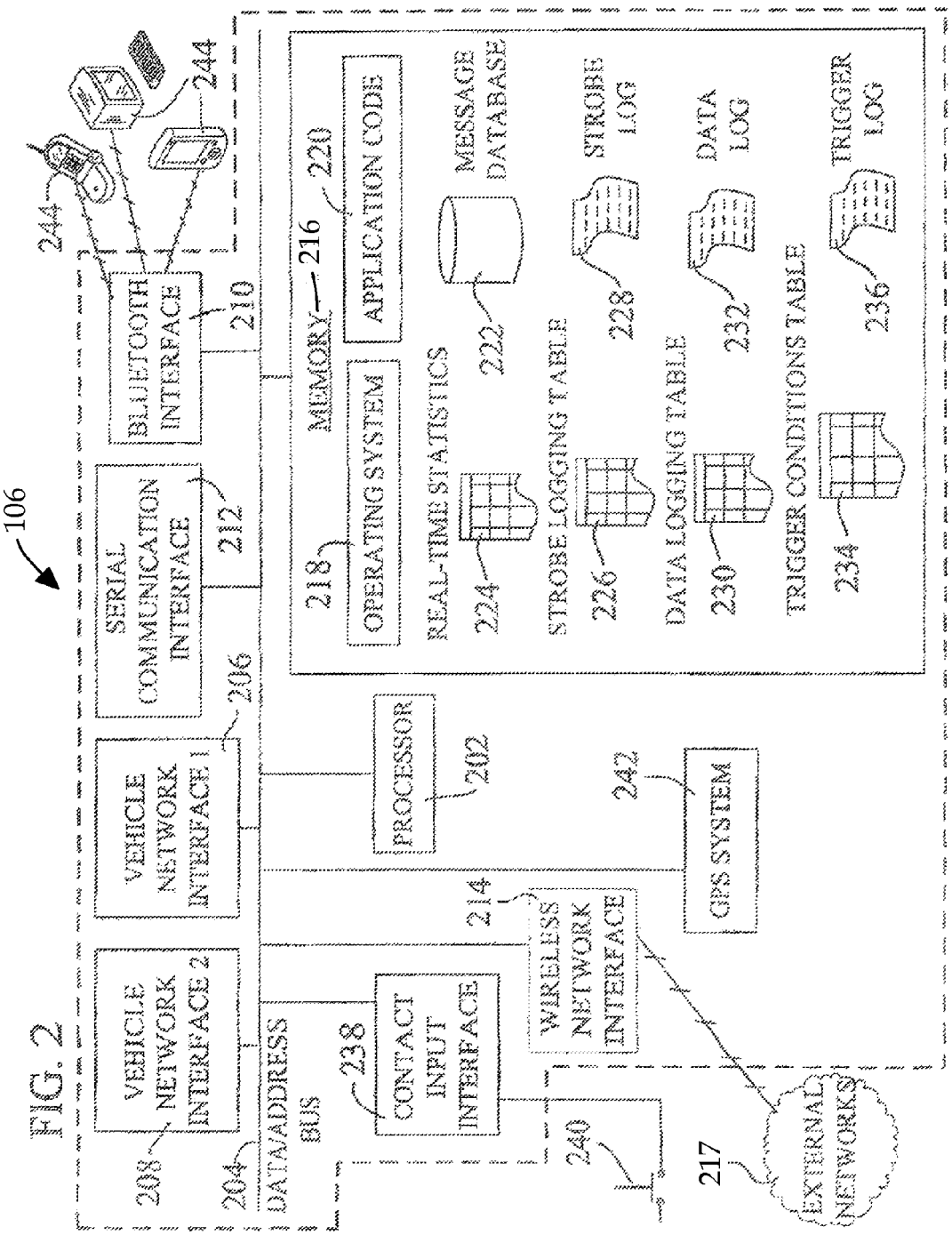
FIG. 2 depicts a block diagram of a vehicle network gateway in accordance with the inventive disclosures herein.

FIG. 2 depicts a block diagram of a vehicle network gateway in accordance with the inventive disclosures herein. The closed dashed line boundary encloses components that are a part of the vehicle network gateway. The vehicle network gateway 106 comprises a programmable logic processor system or processor 202 interfaced to data and address buses (shown as a combined data/address bus 204 in FIG. 2 but in physical implementation may consist of separate data and address buses.). Interfaced to the data/address bus and addressable by the processor 202 are the vehicle network interfaces 206 and 208. FIG. 2 depicts a vehicle network gateway having two vehicle network interfaces 206, 208 for two vehicle networks, however the vehicle network gateway is not limited to the use of two vehicle network interfaces as depicted, but may be provided with any number of vehicle network interfaces as may be necessary to interface to the number of networks provided in the vehicle. Vehicle networks may include multicast shared serial bus networks such as controller area networks (CAN) as are widely applied in motor vehicle application, as well as other types of vehicle networks as known to those skilled in the art and without limitation.

The vehicle network gateway may include a BlueTooth wireless network interface 210 interfaced to the data/address bus 204, as depicted in FIG. 2. BlueTooth is a convenient networking standard for linking two devices over a relative short range, generally less than 30 feet. Many portable electronic devices are equipped with BlueTooth capabilities, including varieties of personal digital assistants (PDAs) and varieties of mobile wireless phones and many computers such as notebook computers. The vehicle network gateway includes one or more serial communication interfaces 212 providing one or more serial data interfaces for communication with external devices. The serial data interfaces can be any of the commonly used serial communications technologies including RS-232, RS-422 and universal serial bus (USB) to name a few. One or more wireless network interfaces 214 are interfaced to the data/address bus 204, providing the vehicle network gateway with the ability to exchange data with at least one external wireless network 217. A memory means 216 comprising one or more memory devices is interfaced to the processor 202 through the data/address bus. The memory means may comprise one or more memory technologies such as non-volatile flash memory, static memory, magnetic memory means such as disk drives, dynamic memory as well as other varieties of memory as would be known to those skilled in the art. The operating system 218 together with the required computer executable application code 220 is stored in the memory. Computer executable code includes code to support bridging of vehicle messages between the vehicle networks and external networks, code to authenticate external network access to the vehicle network gateway, code to monitor, send and receive network messages, code to support network protocols on the vehicle and external networks as well as other computer executable code application as discussed below. A message database 222 is stored to the memory 216. The message database contains network message, node addresses, signal definition and signal range parameters for vehicle sensor and control devices with are interfaced and in communication with the vehicle networks.

In certain embodiments of the vehicle network gateway, the application code 220 includes computer executable code to enable the gathering of real-time statistics 222 of at least a portion of signals transmitted in messages over the vehicle networks. Examples of gathers real-time statistics including, but are not limited to, signal minimum value, maximum value, average value, last valid value, standard deviation, signal in-range count, signal out-of-range count, signal error value count and signal no value count.

In some embodiments of the vehicle network gateway the application code 220 further includes computer executable code for the implementation of strobe logging of a configurable subset of vehicle network signals from the set defined in the message database 222. The strobe logging subset may be defined by attributes in the message database, or by a separate strobe logging definition table 226 stored to the memory 216. The vehicle network gateway monitors the vehicle networks for configured strobe log signals and produces a strobe log 228 containing a sequential table of signal values read from the vehicle network, wherein the strobe log table contains multiple values of each strobe logged signal, the signal values accumulated on a periodic basis while strobe logging is active providing a detailed periodic signal trend. The strobe log may be implemented as a circular queue wherein if the allocated memory limit for the strobe log is reached then the oldest values in the strobe log may be overwritten with newer values as necessary to stay within the allocated memory.

In some embodiments of the vehicle network gateway the application code 220 further includes computer executable code for the implementation of data logging of a configurable subset of vehicle network messages from the set defined in the message database 222. The data logging subset may be defined by attributes in the message database, or by a separate data logging definition table 230 stored to the memory 216. Data logging is acquisition of signal values from vehicle network messages as transmitted over the vehicle networks 206 and 208, producing in a data log 232 containing a sequential table of signal values read from the vehicle network providing a detailed signal trend over time. The data log 232 may be implemented as a circular queue wherein if the allocated memory limit for the data log 232 is reached the oldest values in the data log may be overwritten with newer values as necessary to stay within the allocated memory.

In some embodiments of the vehicle network gateway the application code 220 further includes computer executable code for the implementation of trigger logging of a configurable subset of vehicle network signals from the set defined in the message database 222. The trigger logging subset may be defined by attributes in the message database 222, or by a separate trigger logging definition table 234 stored to the memory 216. Trigger logging logs data before and after signal trigger events. Signal trigger conditions can be detected fault conditions in which case trigger logs are used to capture data before and after a signal trigger event. Each trigger log 236 data set consists of a set of pre-fault trigger values and a corresponding set of post-fault trigger values. Triggers can include such signal trigger conditions as vehicle error conditions, signal outside normal hi/low range limits (as defined in the message database), as well as manual triggering initiated by, for example, a momentary contact input 240 to the vehicle network gateway 106 through a contact input interface 238 which is addressable by the processor 202.

In certain embodiments the vehicle network gateway includes a satellite navigation system or GPS system 242 interfaced to the processor logic system 202 of the vehicle network gateway. The GPS system may be directly integrated with the vehicle network gateway as shown in FIG. 2 or alternately may be interfaced to the vehicle network gateway through a serial interface 212, or the GPS may be addressable as a node on one of the vehicle networks 206 and 208. The GPS provides real-time vehicle coordinates which can be used in logging vehicle location over time, say in one the data log or strobe log, or in another log such as a vehicle location log capturing vehicle location over a given time period, say for monitoring a delivery truck route traveled.

In certain embodiments the vehicle network gateway includes a line of sight visible/invisible light data carrier link, for example an infrared transmitter and receiver. The line of sight data carrier link may be interfaced to the vehicle network gateway through the serial communications interface 212, or alternately may be interfaced to the data/address bus 204 in similar fashion to the wireless network interface 214. In some embodiments, the line of sight data link is used to provide data communications between a hydrogen or other fuel type vehicle and a refueling station for implementing a refueling mode in the vehicle network gateway. In this case, the vehicle network gateway 106 enters the refueling mode when the vehicle fuel door is opened, at which point the vehicle network gateway is in cooperative communication with the refueling station, providing data such as fuel tank charge and pressure to the refueling station.

Figure 3:
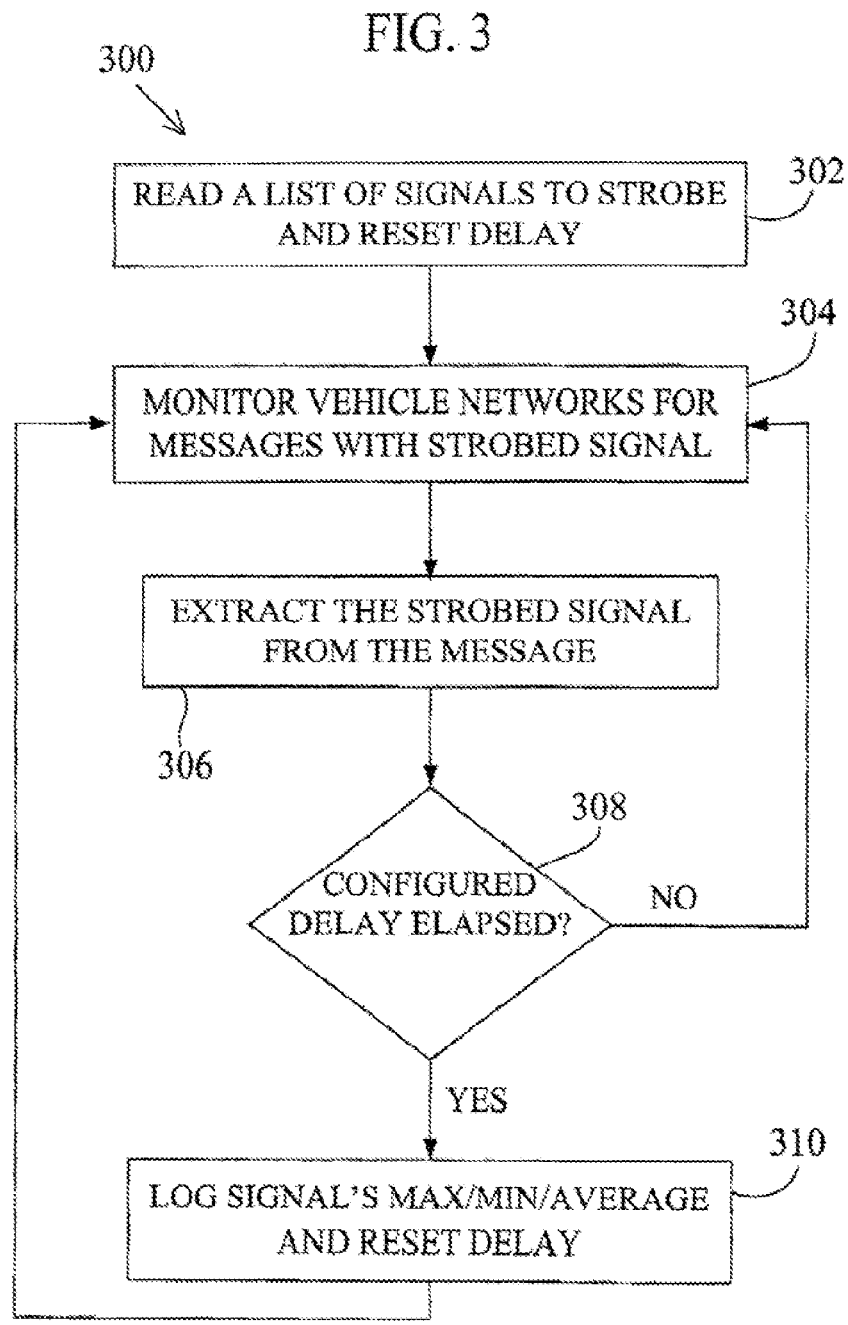
FIG. 3 is a logic flow diagram of method of periodically strobe logging of a configurable set of vehicle network addressable devices/signals by the vehicle network gateway.

FIG. 3 is a logic flow diagram 300 of method of strobe logging of a configurable set of vehicle network addressable devices/signals by the vehicle network gateway. The method begins at step 302 wherein the list of signals to be strobed and a reset delay is read from memory. As discussed earlier with FIG. 2, the strobe logging list may be read from a memory resident table, file or from the message database, depending upon implementation decisions. At step 304 the vehicle network gateway monitors the vehicle networks for messages having signals configured for strobe logging. As messages having configured strobed signals are found, at block 306 the vehicle network gateway extracts the strobed signal values from the messages. Strobe log calculations are performed at periodic intervals determined by the reset delay. At block 308 the time elapsed since the calculation were performed is compared to the configured reset delay, if the elapsed time is less than the reset delay then control transfers to block 304. At block 310 calculations are performed on the strobe logged signals, calculating signal maximum, minimum and average over the reset time delay, and the calculated data is written to the strobe log. Control then transfers to block 304.

Figure 4:
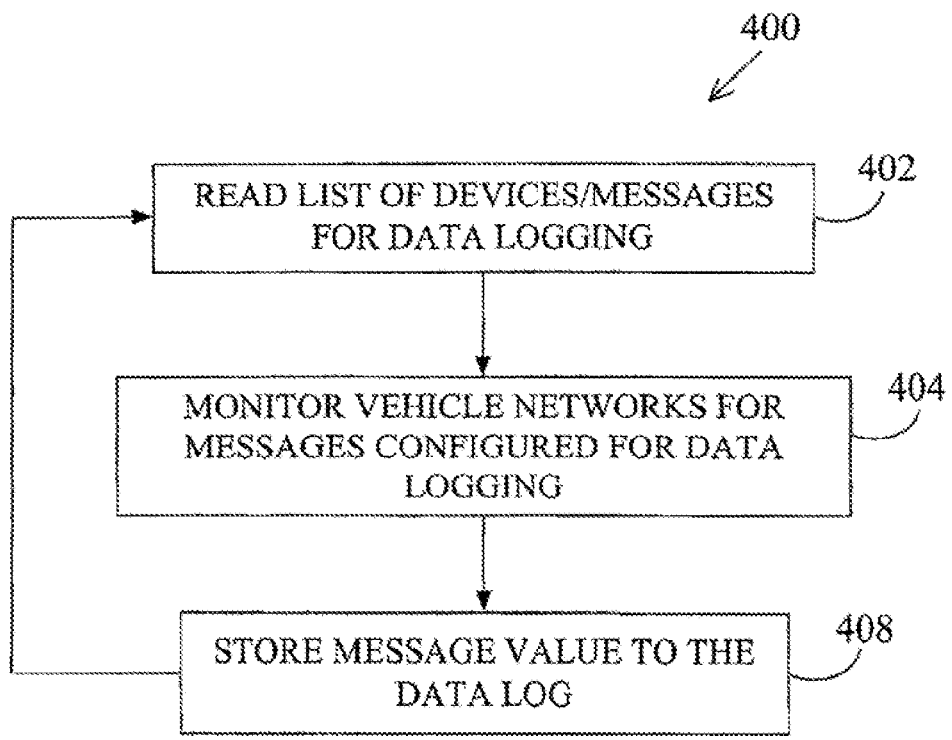
FIG. 4 is a logic flow diagram of method of performing data logging of a configurable set of vehicle network addressable devices/messages by the vehicle network gateway.

FIG. 4 is a logic flow diagram 400 of method of performing data logging of a configurable set of vehicle network addressable devices/messages by the vehicle network gateway. The method begins at step 402 wherein the list of configured network devices and messages for data logging is read from memory. As discussed earlier with FIG. 2, the data logging list may be read from a memory resident table, file or from the message database, depending upon implementation decisions. At step 404 the vehicle network gateway monitors vehicle network traffic over the vehicle networks, watching for any of the messages that were configured for data logging. When a message that is configured for data logging is detected, the entire message value is stored to the data log at step 408, as discussed more fully with FIG. 2. Control is then transferred to block 404 to continue monitoring the vehicle network message traffic.

Figure 5:
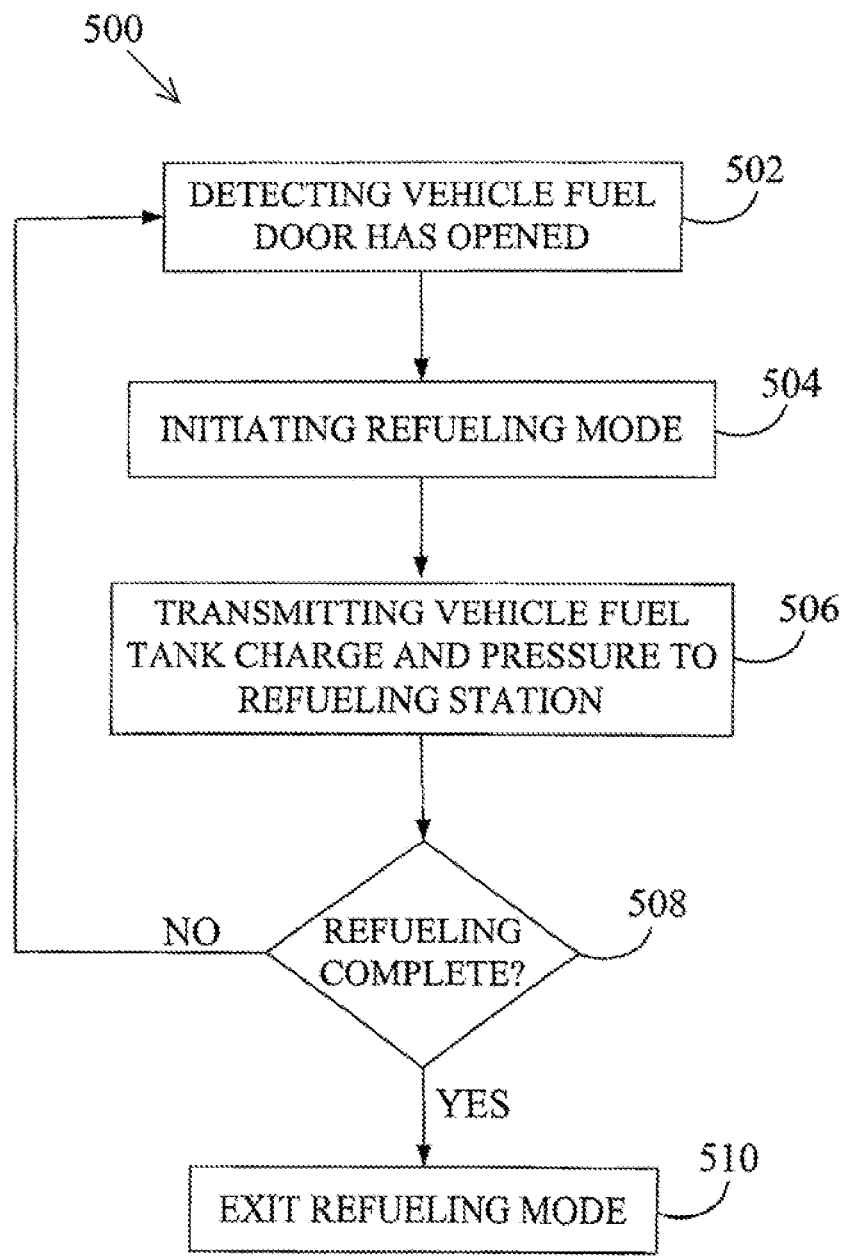
FIG. 5 is a logic flow diagram of method for the vehicle network gateway to support a hydrogen vehicle refueling mode.

FIG. 5 is a logic flow diagram 500 of method for the vehicle network gateway to support a hydrogen vehicle refueling mode. The method begins at block 502 when the vehicle network gateway detects that the vehicle fuel door has opened. At block 504 the vehicle network gateway initiates hydrogen refueling mode. During the refueling vehicle hydrogen tank pressure and charge information is transmitted to the refueling station using one of the wireless network or link communication techniques discussed earlier with FIG. 2 and FIG. 1. At block 508 the vehicle network gateway monitors the refueling watching for the end of the refueling operation. One indication of the end of the refueling operation is the closing of the vehicle fuel door. Once the end of the refueling operation is detected at block 508, then control transfers to block 510 and the vehicle network gateway exits the refueling mode.

Figure 6:
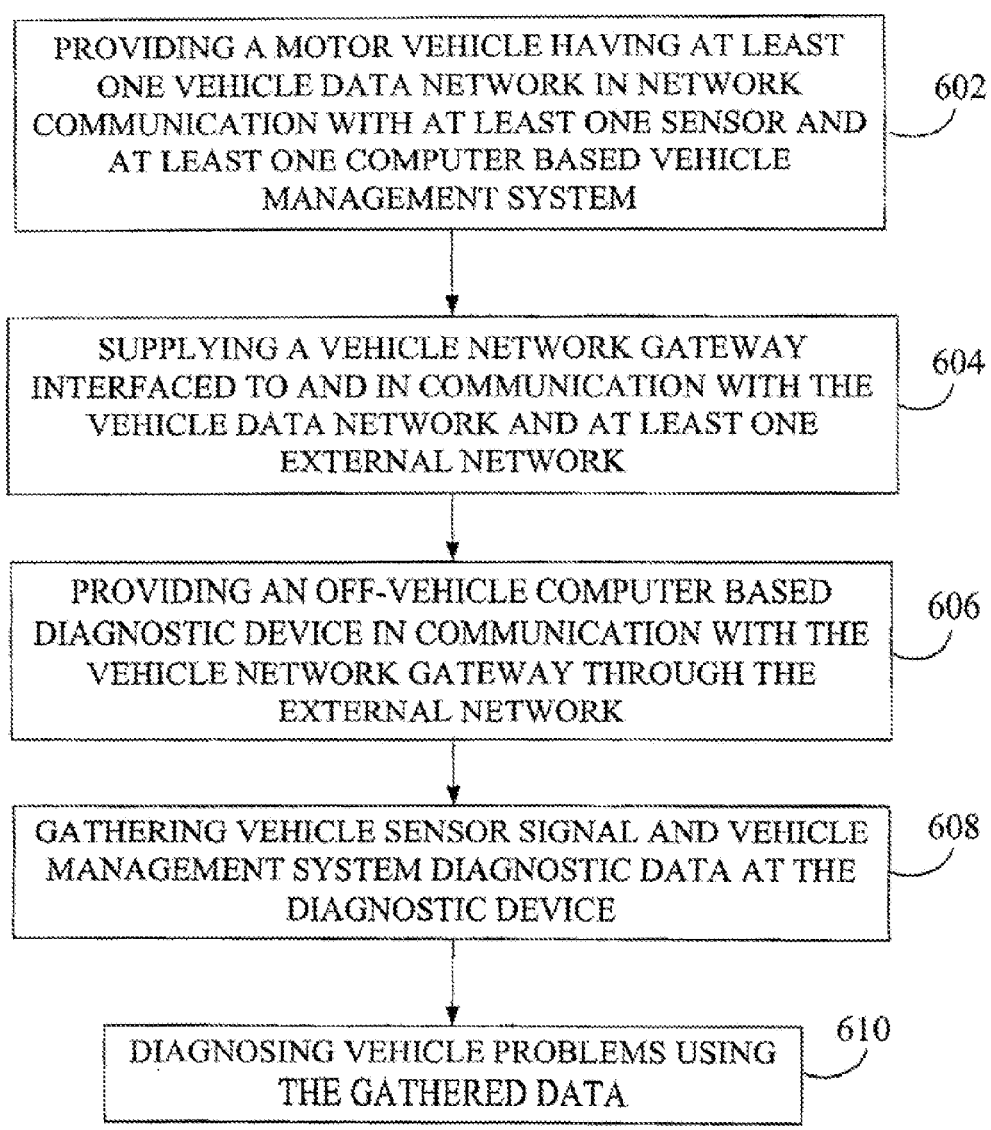
FIG. 6 is a logic flow diagram of a method of diagnosing possible motor vehicle problems over a wireless network in communication with the vehicle network gateway.

FIG. 6 is a logic flow diagram 600 of a method of diagnosing possible motor vehicle problems over a wireless network in communication with the vehicle network gateway. The method begins at block 602 by providing a motor vehicle which has at least one vehicle data network in communication with one or more vehicle network connected vehicle sensor and actuator devices, as well as in communication with at least one computer based vehicle management system, for example, an engine management system. At block 604 a vehicle network interface is provided and interconnected with and in communication with the one or more vehicle data networks. The vehicle network interface is configured and adapted to communicate with at least one external wireless network. At block 606 a diagnostic service device is provided, for example a computer running diagnostic software. The diagnostic device is in communication with the vehicle network gateway over the wireless network. At block 608 the diagnostic service device queries for, receives and gathers vehicle sensor signal and vehicle management system diagnostic data over the wireless network from the vehicle network gateway. Gathered data may include any portion of available real-time or dynamic vehicle signal data, such as sensor measurements, as well as error codes and data from vehicle network gateway generated logs such as trigger logs, strobe logs, and data logs and real-time statistics. The gathered data is processed through diagnostic software in the diagnostic device to produce a vehicle problem diagnosis at block 610.

Figure 7:
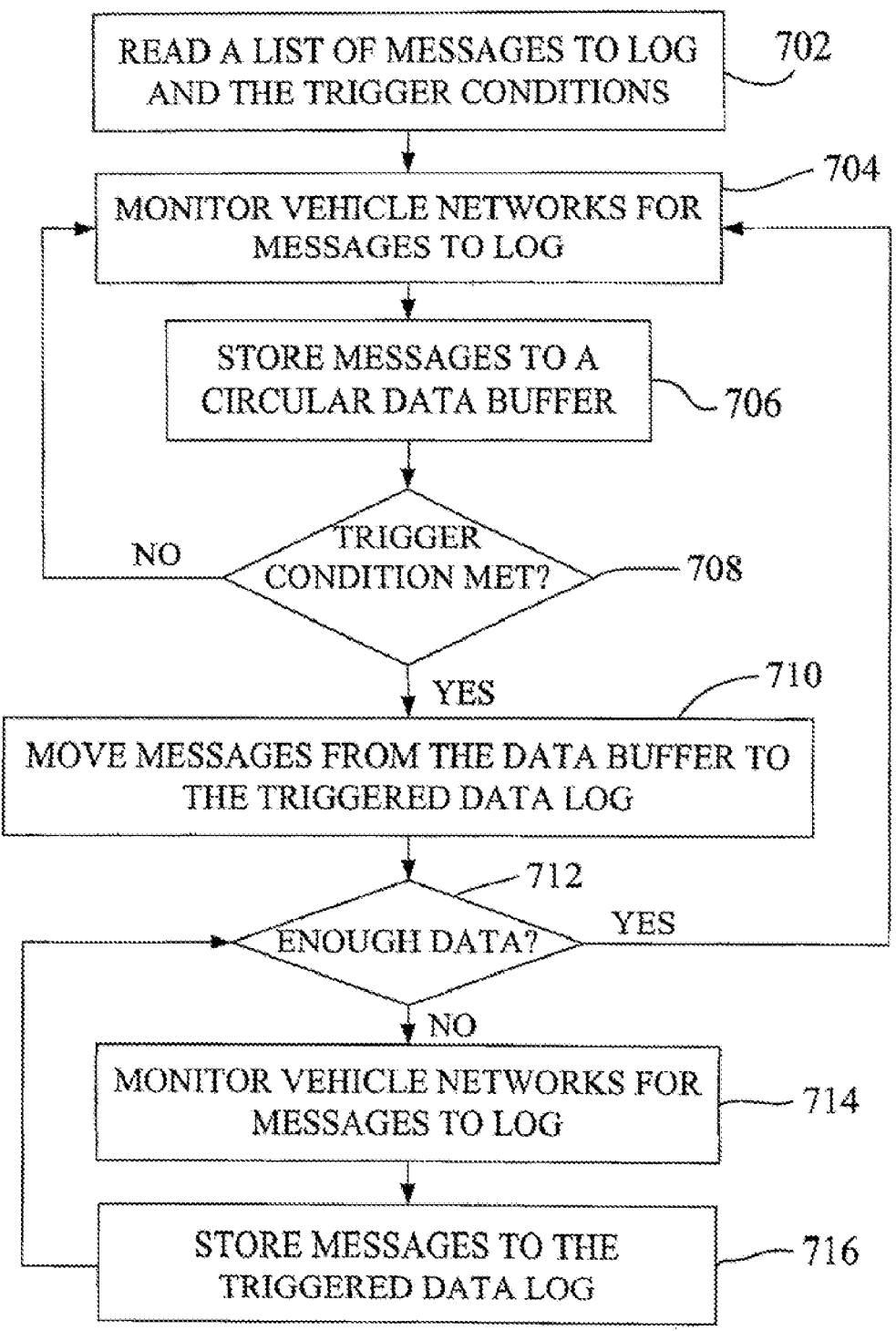
FIG. 7 is a logic flow diagram of a method of performing triggered data logging of a configurable set of vehicle network messages.

FIG. 7 is logic flow diagram of a method of performing triggered data logging of a configurable set of vehicle network messages. The method begins at step 702 where the list of messages to log and the trigger conditions are read from memory. At step 704 the vehicle network gateway monitors vehicle network traffic over the vehicle networks, watching for any of the message/signals that were configured for trigger data logging. When a message/signal that is configured for trigger data logging is detected, then at block 706 the vehicle network gateway stores the message to a circular data buffer. Block 708 tests if any of the trigger conditions have been met. If the trigger conditions are not met then control transfers to block 704. At block 708 if trigger conditions are met then control transfers to block 710 where messages are moved from the circular data buffer to the triggered data log. The triggered data log has a configured capacity limit. At block 712 if space remains in the trigger data log for another set of trigger data the control transfers to 714, otherwise control transfers to block 704. At block 714 the vehicle network gateway monitors vehicle network traffic over the vehicle networks, watching for any of the message/signals that were configured for trigger data logging. When a message/signal that is configured for trigger data logging is detected, then at block 716 the vehicle network gateway stores the message to the triggered data log and control transfers to block 712.

Figure 8:
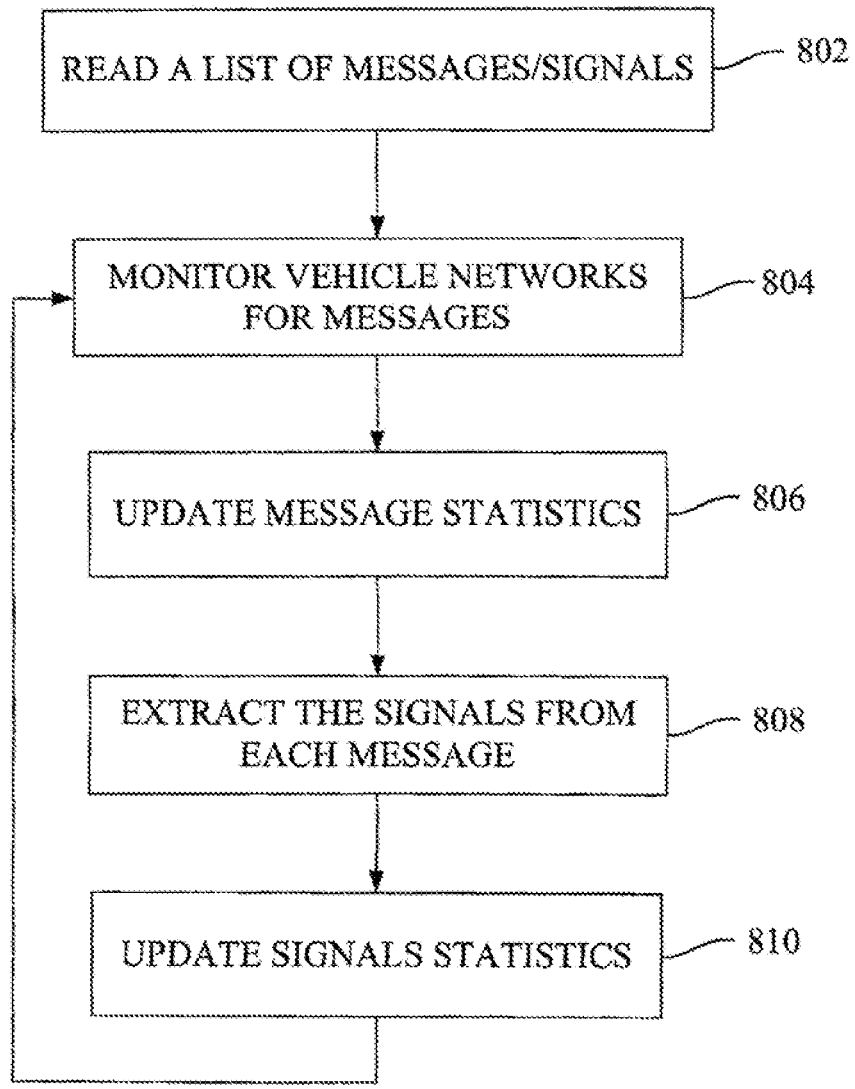
FIG. 8 is a logic flow diagram of a method of calculating message and signal statistics by the vehicle network gateway.

FIG. 8 is logic flow diagram of a method of calculating message and signal statistics by the vehicle network gateway. The method begins at step 802 where the list of messages and signals to be monitored for statistics calculations are read from memory. At step 804 the vehicle network gateway monitors vehicle network traffic over the vehicle networks, watching for any of the message/signals that were configured for statistics calculations. When a message/signal that is configured for statistics calculations is detected, then at block 806 the vehicle network gateway updates the message statistics. At block 808 the vehicle network gateway extracts the signals from each message. Then at block 810 the signal statistics are updated.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, electrical, networking technology, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

While particular embodiments of the invention have been shown and described, numerous variations and alternate embodiments will occur to those skilled in the art. Accordingly, it is intended that the invention be limited only in terms of the appended claims.

What is claimed is:

1. A vehicle network gateway apparatus in communication with at least one vehicle data network, the apparatus for bridging data between vehicle data networks and at least one external data network, the vehicle network gateway apparatus comprising:
   a programmable processor logic system;
   a memory means comprising at least one memory storage device;
   computer executable code resident in the vehicle network gateway for monitoring vehicle network message traffic, receiving vehicle network messages, interpreting vehicle network messages, generating and sending vehicle network messages;
   computer executable code resident in the vehicle network gateway for bi-directional bridging of vehicle message data between the at least one vehicle network and the at least one external network, wherein the bridging comprises converting messages between a vehicle network protocol and at least one external network protocol;
   at least one vehicle network interface device for interfacing to at least one vehicle data network, the at least one vehicle network interface in communication with the programmable processor logic system; and
   at least one external network interface device for interfacing to at least one external data network, the at least one external network interface in communication with the programmable processor logic system;
   computer executable code resident in the vehicle network gateway for authenticating external network access to the vehicle network gateway, wherein off board systems that are not authenticated are limited to read only access to data through the gateway;
   a vehicle network message database stored to the memory means, the message database defining vehicle network messages, nodes, signal and signal range parameters; and
   computer executable code resident in the vehicle network gateway for accumulating real-time statistics of at least a portion of networked vehicle signals, comprising the steps of:
   reading a configured list of messages and signals;
   monitoring the vehicle networks for configured messages;
   updating message statistics;
   extracting signals from each message;
   calculating signal statistics; and
   continuing at the monitoring step.

2. The vehicle network gateway apparatus of claim 1, wherein the real-time statistics comprise:
   signal minimum value, maximum value, average value, last value, standard deviation, signal in-range count, signal out-of-range count, signal error value count, and signal no value count.

3. A vehicle network gateway apparatus in communication with at least one vehicle data network, the apparatus for bridging data between vehicle data networks and at least one external data network, the vehicle network gateway apparatus comprising:
- a programmable processor logic system;
- a memory means comprising at least one memory storage device;
- computer executable code resident in the vehicle network gateway for monitoring vehicle network message traffic, receiving vehicle network messages, interpreting vehicle network messages, generating and sending vehicle network messages;
- computer executable code resident in the vehicle network gateway for bi-directional bridging of vehicle message data between the at least one vehicle network and the at least one external network, wherein the bridging comprises converting messages between a vehicle network protocol and at least one external network protocol;
- at least one vehicle network interface device for interfacing to at least one vehicle data network, the at least one vehicle network interface in communication with the programmable processor logic system; and
- at least one external network interface device for interfacing to at least one external data network, the at least one external network interface in communication with the programmable processor logic system;
- computer executable code resident in the vehicle network gateway for authenticating external network access to the vehicle network gateway; wherein off board systems that are not authenticated are limited to read only access to data through the gateway;
- a vehicle network message database stored to the memory means, the message database defining vehicle network messages, nodes, signal and signal range parameters; and
- computer executable code resident in the vehicle network gateway for signal strobe logging of a configurable strobe logging subset of signals from a vehicle network as defined in the message database, comprising the steps of:
- reading list of configured signals to be strobed and a configured delay time;
- monitoring the vehicle network for messages having configured strobed signal;
- extracting the strobed signal from the message, if the configured delay has not elapsed then continuing at the monitoring step;
- storing the maximum, minimum, average of each strobed signal to a strobe log; and
- continuing at the monitoring step, wherein the strobe log provides a detailed periodic signal value trend over time.

4. A vehicle network gateway apparatus in communication with at least one vehicle data network, the apparatus for bridging data between vehicle data networks and at least one external data network, the vehicle network gateway apparatus comprising:
- a programmable processor logic system;
- a memory means comprising at least one memory storage device;
- computer executable code resident in the vehicle network gateway for monitoring vehicle network message traffic, receiving vehicle network messages, interpreting vehicle network messages, generating and sending vehicle network messages;
- computer executable code resident in the vehicle network gateway for bi-directional bridging of vehicle message data between the at least one vehicle network and the at least one external network, wherein the bridging comprises converting messages between a vehicle network protocol and at least one external network protocol;
- at least one vehicle network interface device for interfacing to at least one vehicle data network, the at least one vehicle network interface in communication with the programmable processor logic system; and
- at least one external network interface device for interfacing to at least one external data network, the at least one external network interface in communication with the programmable processor logic system;
- computer executable code resident in the vehicle network gateway for authenticating external network access to the vehicle network gateway, wherein off board systems that are not authenticated are limited to read only access to data through the gateway;
- a vehicle network message database stored to the memory means, the message database defining vehicle network messages, nodes, signal and signal range parameters; and
- computer executable code resident in the vehicle network gateway for configuring and detecting a set of vehicle network signal trigger conditions; and
- computer executable trigger logging code resident in the vehicle network gateway for capturing a configurable trigger log set of selected vehicle network signals and logging at least one signal value to a trigger data log in the memory means, the trigger logging providing a memory stored context of signal values before, at the occurrence of, and for a period of time after the detection of a trigger condition, the trigger logging data useful for diagnosing vehicle problems, comprising the steps of:
- reading a list of configured messages to log and trigger conditions;
- monitoring vehicle networks for configured messages, if configured messages found then reading the messages;
- storing the read messages to a circular data buffer, if trigger condition not met then continuing at the monitoring step;
- moving messages from the circular data buffer to the triggered data log;
- continuing if more data to be gathered, otherwise continuing at the monitoring step;
- watching the vehicle networks for configured messages, if configured messages found then reading the messages; and
- storing the read messages to a circular data buffer, if trigger condition not met then continuing at the continuing if more data step.

5. The vehicle network gateway apparatus of claim 4, wherein the signal trigger conditions comprise:
- vehicle error conditions;
- signals outside normal hi/low range limits; and
- manual triggering by momentary contact input to the vehicle network gateway.

6. The vehicle network gateway apparatus of claim 1, further comprising:
- a satellite navigation system receiver interfaced to and in communication with the vehicle network gateway, wherein the vehicle network gateway has real-time access to vehicle position coordinates.

7. The vehicle network gateway apparatus of claim 1, wherein at least one vehicle data network is a multicast shared serial bus network.

8. The vehicle network gateway apparatus of claim 1, wherein
   at least one external network is a wireless LAN network; and
   wherein the apparatus further comprises at least one wireless network interface, wherein the interface includes wireless RF transmitter/receiver means and protocol support means.

9. The vehicle network gateway apparatus of claim 1, wherein
   at least one external network is accessed via a line of sight visible/invisible light data carrier link; and
   wherein the apparatus further comprises at least one line of sight visible/invisible light data interface.

10. The vehicle network gateway apparatus of claim 1, further comprising support for a hydrogen vehicle refueling mode, comprising the steps of:
   detecting that the vehicle refueling door has opened;
   initiating the refueling mode;
   transmitting vehicle fuel tank charge and pressure to the refueling station;
   continuing at the transmitting step until refueling has completed; and
   exiting the refueling mode.

* * * * *